United States Patent Office 2,981,800
Patented Apr. 25, 1961

2,981,800

TRANSISTORIZED TIME MULTIPLEXER FOR TELEMETERING

Jacob M. Sacks, Corona, and Eugene R. Hill, Riverside, Calif., assignors to the United States of America as represented by the Secretary of the Navy Filed Aug. 23, 1957, Ser. No. 680,029

4 Claims. (Cl. 179—15)

(Granted under Title 35, U.S. Code (1952), sec. 266)

The invention described herein may be manufactured and used by or for the Government of the United States of America for governmental purposes without the payment of any royalties thereon or therefor.

This invention relates to telemetering and more particularly to a transistorized time multiplexer or commutator which develops a commutated pulse amplitude modulated (PAM) signal for time multiplexing of an FM/FM or a PAM/FM telemeter which is capable of channel switching rates up to at least 15 kilocycles.

The present system is generally similar to the multi-channel pulse modulated data transmission system disclosed in the copending application of Myron G. Pawley, Serial No. 614,993, filed October 9, 1956. The system of the present invention, however, has certain inherent advantages due to the transistorizing of the circuits which use semi-conductor diodes and transistors exclusively with no vacuum or gas tubes and the inter-relationship of the circuits including the balanced power supply which provides high accuracy, high speed and stability over a wide temperature and voltage range with low power consumption and without critical selection or matching of components.

The system of the present invention in one preferred modification consists essentially of a master oscillator which triggers a multivibrator driver which actuates two closed ring stepping chains. The multivibrator driver and the two multivibrator rings are connected to a rectangular array of diode coincidence switches to which the channel inputs are connected for sampling each channel once per frame. A frame pulse generator is also connected to the diode coincidence switches for providing a frame synchronizing pulse during a time interval equivalent to a number of channel intervals with an amplitude corresponding to the maximum channel input. In order to prevent interference with the active channels a premature reset of the ring stepping chains is accomplished during the frame sync pulse period. Each channel may be gated off for half of the period of the multivibrator driver during which time a negative potential is applied to the common output terminal in order to set the required minimum modulation level.

The multivibrator driver and the channel selector multivibrator utilized in the multivibrator rings are minor modifications of two of the circuits disclosed in the copending application for a Transistor Bistable Multivibrator by J. M. Sacks, Serial No. 680,031, filed August 23, 1957.

One object of the present invention is to provide a transistorized time multiplexer which develops a commutated PAM signal for time multiplexing of a PAM/FM or an FM/FM telemeter system.

Another object of the present invention is to provide a transistorized time multiplexer which is capable of high speed channel switching at rates up to at least 15 kilocycles.

A further object of the present invention is to provide a transistorized time multiplexer having a high degree of accuracy with a minimum deviation from linearity, interchannel uniformity, zero drift and sensitivity change substantially less than one percent of full scale voltage, and a channel sampling rate change of less than one percent.

Still another object of the present invention is to provide a transistorized time multiplexer wherein the inherent accuracy is virtually unaffected by changes in supply voltage and a wide range of temperature variation, and without critical selection or matching of components.

A still further object of the present invention is to provide a transistorized time multiplexer or commutator which has a very low total power consumption and a low voltage drop across the channel gating switches with maximum voltage input.

Another object of the present invention is to provide a novel transistorized oscillator whose output frequency is stable and essentially independent of transistor parameters.

Other objects and many of the attendant advantages of this invention will be readily appreciated as the same becomes better understood by reference to the following detailed description when considered in connection with the accompanying drawings wherein:

Figure 1:
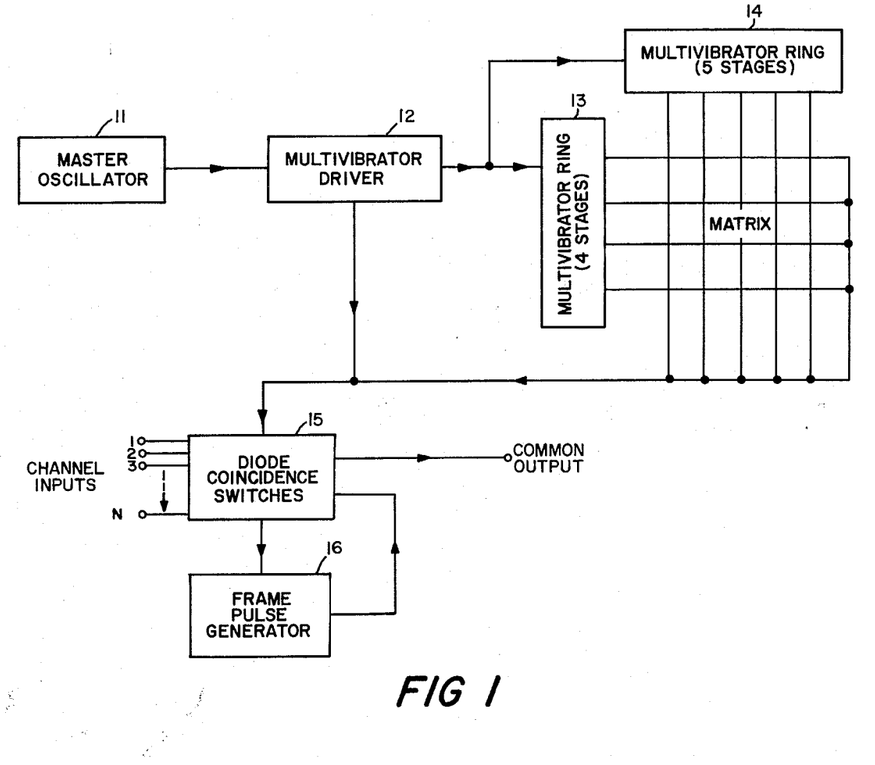
Fig. 1 is a block diagram illustrating one preferred form of the system of the present invention.
Figure 2:
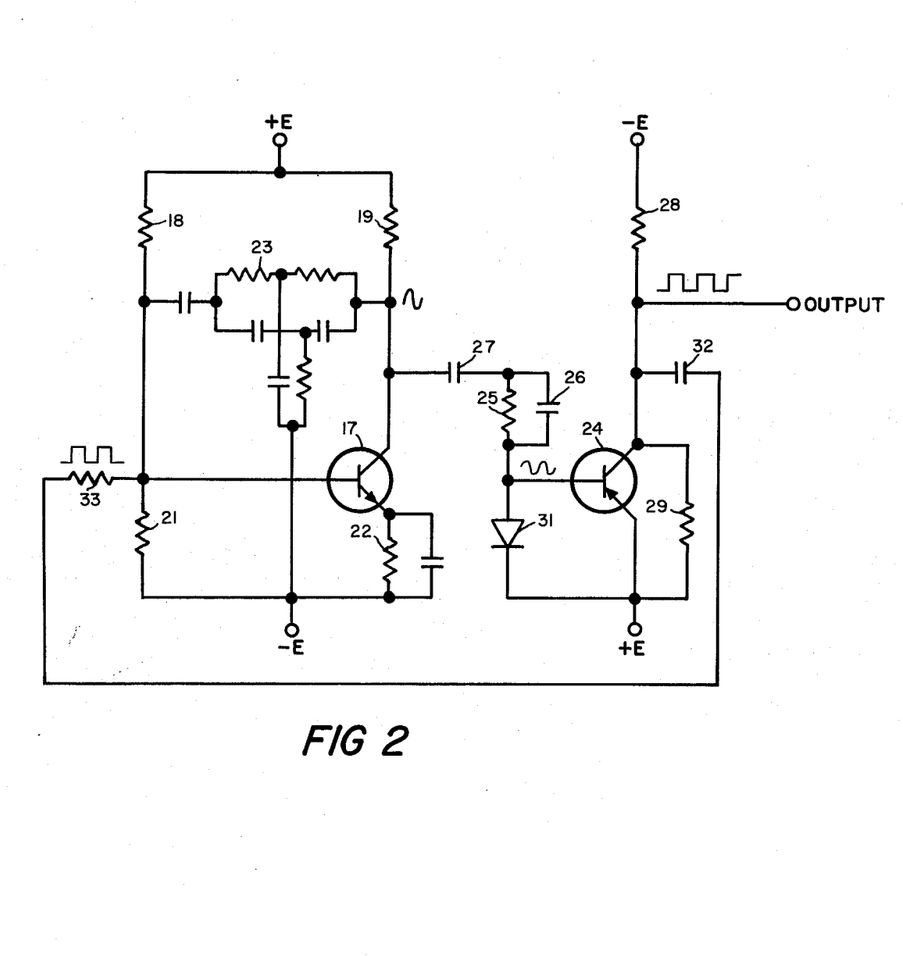
Fig. 2 is a schematic circuit diagram illustrating one preferred form of the master oscillator of Fig. 1.

Referring now to the drawings in detail and more particularly to the block diagram of Fig. 1, the master oscillator 11, which is also illustrated in detail in Fig. 2, provides a square wave output at a constant rate, the frequency of which is essentially independent of changes in transistor parameters and temperature variations with an output such as that illustrated in Fig. 2.

Figure 3:
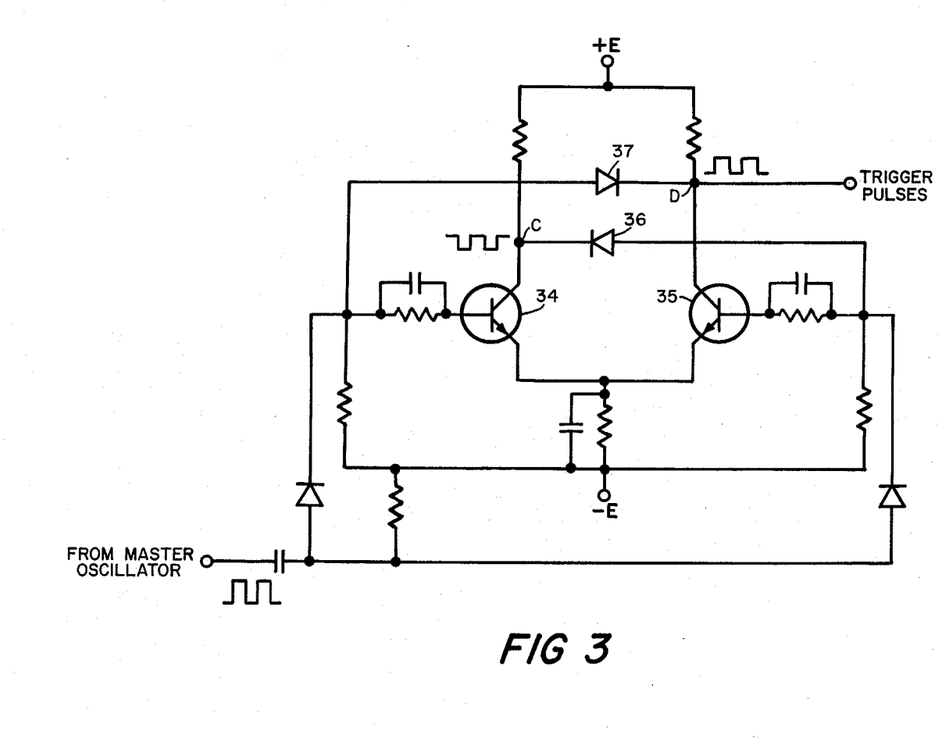
Fig. 3 is a schematic circuit diagram illustrating one preferred form of the multivibrator driver of Fig. 1.

The square wave output from the master oscillator is differentiated to trigger the multivibrator 12 at a frequency which is one-half the frequency of the oscillator. The multivibrator driver 12 which is illustrated in detail in Fig. 3 provides a series of trigger pulses with an output waveform such as that illustrated in Fig. 3 and Fig. 7 which are balanced about ground for a proper operation of the channel selector switches and the multivibrator rings 13 and 14.

The multivibrator ring 13 has been illustrated as having four stages and the multivibrator ring 14 having five stages for the particular application in conjunction with the FM/FM telemetering systems commonly used at present. However the number of stages may be increased as desired to gate any desired number of channel inputs up to the maximum channel sampling rate. Three typical stages of the multivibrator rings 13 and 14 are illustrated in detail in Fig. 4.

The multivibrator driver 12 and the matrix from the two multivibrator rings 13 and 14 are connected to the diode coincidence switches 15. One of the basic channel gating switch circuits utilized in the diode coincidence switches 15 is illustrated in detail in Fig. 5.

Figure 4:
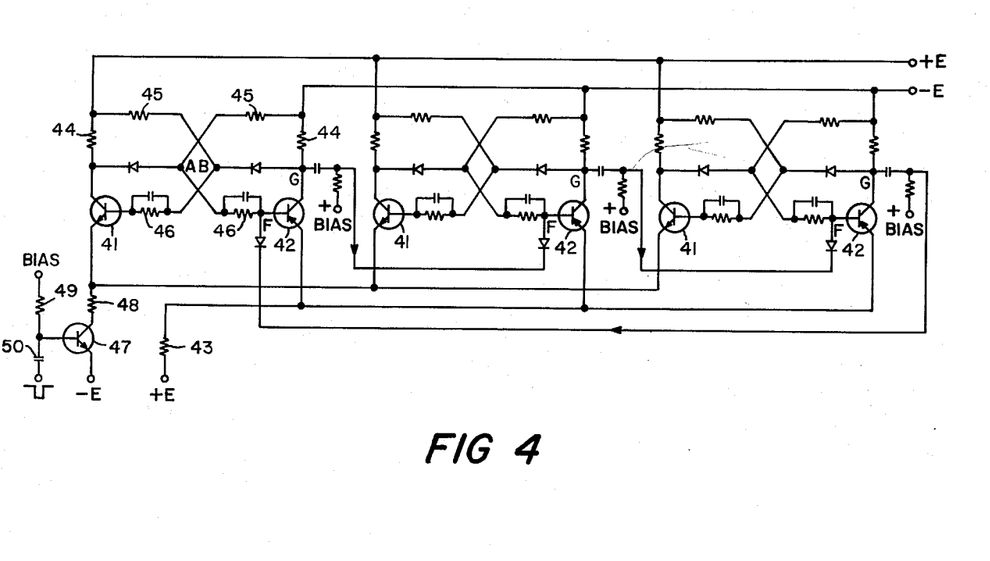
Fig. 4 is a schematic circuit diagram illustrating one preferred arrangement for three typical stages of the multivibrator rings of Fig. 1 and their inter-connections.
Figure 5:
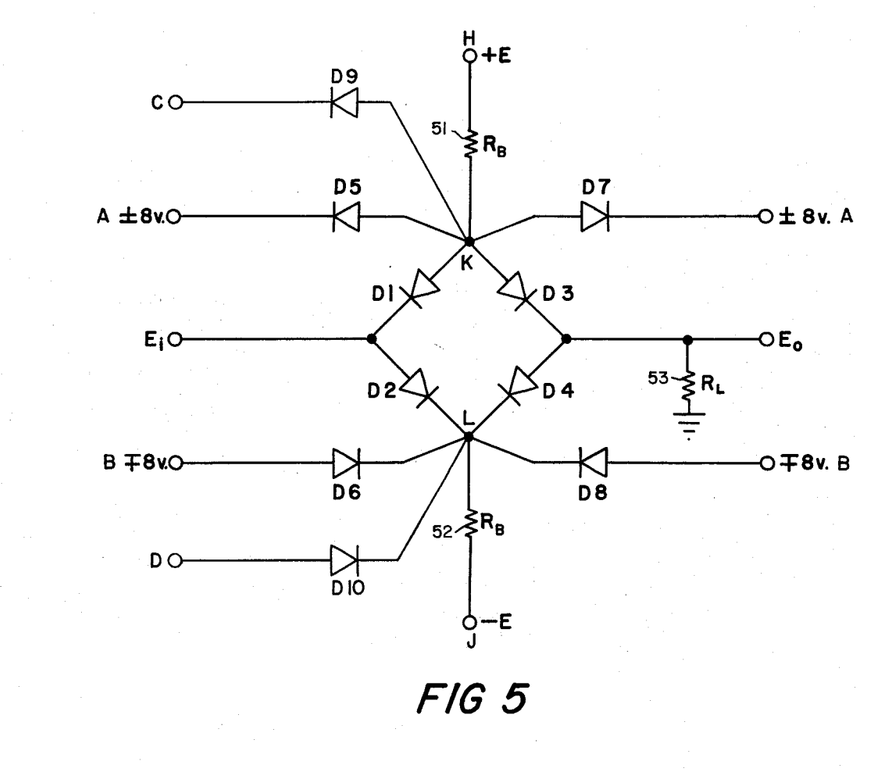
Fig. 5 is a schematic circuit diagram illustrating one preferred form of the channel gating switches utilized in the diode coincidence switches of Fig. 1.
Figure 6:
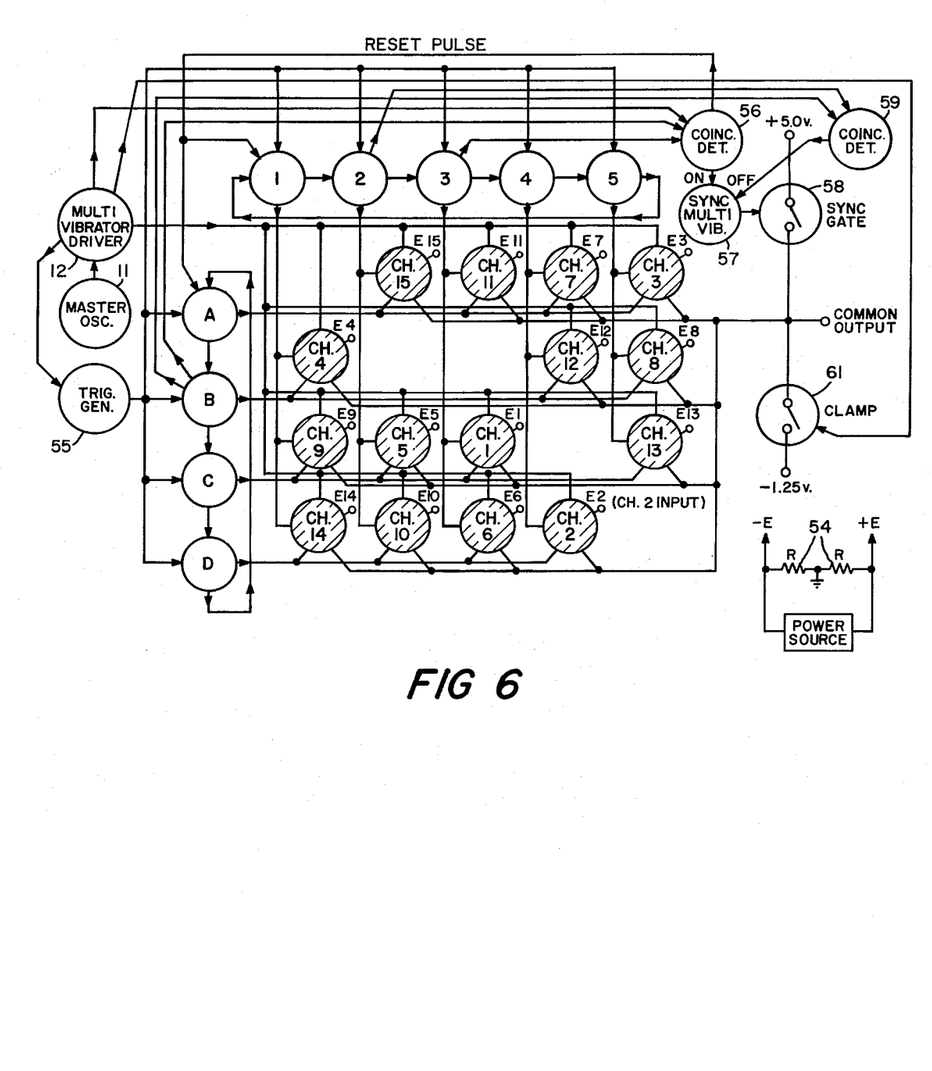
Fig. 6 is a schematic diagram illustrating one preferred form of the component inter-connections in the system of the present invention and the balanced power source which is connected to the circuits as illustrated in Figs. 2 through 6.

The inner-connection of the individual channel gating switches with the master oscillator 11, multivibrator driver 12, multivibrator rings 13 and 14, and the frame pulse generator 16 is illustrated schematically in Fig. 6 together with the balanced power source which supplies the detailed circuits illustrated in Figs. 2 through 5.

One specific example of the present system operates in the following manner: The system as shown in Figs. 1 and 6 accommodates 15 active channels each including a diode switch such as the one illustrated in detail in Fig. 5. The channel switches are connected in a 5 x 4 rectangular array and are gated by coincident pulses from the two closed ring stepping chains or multivibrator rings 13 and 14 comprising a total of nine bistable transistor multivibrators, five in one chain, four in the other. Since five and four are mutually prime numbers, both chains can be stepped at the same rate to sample each channel once per frame. The chains are independently self-starting. Only 18 of the 20 matrix elements are used, 14 for active channels and 3 for frame synchronization. Premature reset of the two-ring stepping chains after 18 matrix elements have been selected is attained with diode coincidence detectors. Since each channel is sampled ten times per second, the two-ring stepping chains must be stepped 180 times per second.

In order to assure stability of the sampling rate, the multivibrator driver 12 is triggered by the stabilized sine wave master oscillator 11 operating at 360 cycles per second. The desired 50% duty cycle for the transmitted signal is assured by gating off each channel for half the period of the multivibrator driver 12. During the channel off-time, a potential of $-1.25$ volts may be applied to the common output terminal in order to set the required minimum modulation level.

The frame synchronizing pulse occupies a time interval equivalent in duration to 2½ channel intervals and has an amplitude corresponding to 5.0 volts channel input. In order to present interference with the active channels, the premature reset of the ring stepping chains is accomplished during the frame sync pulse period.

*Detailed description*

One preferred embodiment of a transistorized master oscillator for use in the system of the present invention is illustrated in Fig. 2 and consists of a parallel T network, a linear high gain amplifier stage and a squaring amplifier or limiting stage with a regenerative feedback as shown in Fig. 2. The linear or selective amplifier stage includes a transistor 17 which is connected to a positive voltage indicated at the terminal $+E$ through the load resistors 18 and 19 in the base and collector circuits respectively. The base and emitter circuits are also connected to the negative voltage source $-E$ through resistors 21 and 22.

Selectivity of the amplifier stage is achieved with a parallel T null network 23 connected between collector and base electrodes of the transistor 17 and also connected to the negative terminal $-E$. To facilitate decommutation, it is desirable to drive the commutator at a constant rate. The frequency at which this circuit oscillates is primarily dependent upon the null frequency of the parallel T and is essentially independent of changes in transistor parameters. For an increase in temperature from 25° to 70° C., the frequency shift is less than 1%.

The limiting stage includes a transistor 24 which is connected from its base circuit to the collector of transistor 17 through an RC circuit, consisting of the resistance 25 and condenser 26, and another condenser 27. Transistor 24 has its collector circuit connected through a resistance 28 to the negative voltage terminal $-E$ and its emitter circuit is connected to the positive voltage terminal $+E$ with a resistance 29 between the collector and emitter and a diode 31 between the base and emitter. Regenerative feedback from the limiter stage to the selective amplifier stage is achieved through the connection between the collector circuit of transistor 24 through condenser 32 and resistance 33 to the base of transistor 17.

This negative feedback connection is such that the transfer function operating between the null network 23 input terminals and the transistor amplifier output terminals is the inverse of the null network transfer characteristics. In other words, the whole configuration has a sharply peaked response at the network null frequency.

The squaring amplifier accepts the sinusoidal signal appearing at the output (collector) terminal of the high gain transistor amplifier and amplifies it such that the said limiter or squaring amplifier is driven between cutoff and saturation. The output of the limiter thus comprises a square wave having relatively steep leading and trailing edges. Only a small sinusoidal signal is required at the limiter input to insure complete squaring by virtue of the high gain of this circuit.

The squared signal at the limiter output is fed back into the high gain amplifier input, and the phase is such that this feedback is positive or regenerative.

Since the amplifier is peaked at a single frequency, only this frequency is selected and passed through. After squaring the signal is fed back, the process being self-sustaining. Oscillations are thus started and maintained at a frequency determined by the null network. Amplitude stability is insured by the limiting action. Trigger pulses are directly available by differentiating the high amplitude square wave output of the limiter. Tests on a completed unit confirm that frequency and amplitude stability is excellent over a wide temperature range.

This oscillator produces a 360 c.p.s. square wave which is differentiated to trigger the multivibrator driver circuit illustrated in Fig. 3 at 180 cycles per second. In order to make the present system compatible with other equipment in common use at the present time, the multivibrator driver inhibits each channel gating switch for the first half of each channel period and simultaneously connects a $-1.25$ volt reference to the output.

To inhibit each channel gating switch for 50% of its period requires two additional diodes per channel.

The multivibrator driver illustrated in Fig. 3 employs two NPN transistors 34 and 35 with a pair of back-biased diodes 36 and 37 operated in the breakdown region as coupling elements. This circuit and its operation are described in detail in the co-pending application of J. M. Sacks mentioned supra. This circuit is operated preferably between $+22.5$ volts and $-22.5$ volts so that the output waveforms are balanced about ground for proper operation of the channel selector switches.

The bistable multivibrator that controls opening and closing of the channel gating switches consists of a PNP-NPN transistor pair 41 and 42, three stages being shown in Fig. 4 with their innerconnections and the supply voltages $-E$ and $+E$.

These circuits are each substantially identical with the circuit described in detail as one modification in the co-pending application of J. M. Sacks mentioned supra. In the on state, both transistors 41 and 42 are conducting and in the off state both are non-conducting in any one of the multivibrator circuits.

The waveforms used to operate the channel gating switches appear at points A and B. The voltage excursion at these points with the supply voltages as indicated is approximately plus or minus 8 volts. When several such multivibrators are combined in a ring each is triggered on at point F by the differentiated waveform from point G of the preceding stage. Since only one multivibrator in each ring is in the on condition at any instant, all PNP emitters are connected together through a common resistor 43 to the $+E$ voltage of 22.5 volts.

Neglecting leakage current, the common emitter busses remain at zero potential if the resistance 43 is made equal to each of the resistances 44 in parallel with the associated resistances 45 and 46.

The principal advantage gained by using the common emitter resistor is that under these conditions each ring includes only one multivibrator in the on condition. This type of multivibrator ring provides a great saving in current since in the off condition each multivibrator draws only approximately 10% of the current required in the on condition.

The on state can be stepped forward one position by a trigger generator which may comprise a normally saturated transistor 47 connected to the emitters of each of the NPN transistors 41 through a resistor 48 and provided with a bias to the base through resistor 49. The transistor 47 is periodically turned off by the trigger pulses from the multivibrator driver 12 applied through a condenser 50. These pulses step the ring at a constant predetermined rate so that two such multivibrator rings, one comprising four stages and the other five, drive a rectangular matrix of 20 elements as shown in Figs. 1 and 6.

Figure 7:
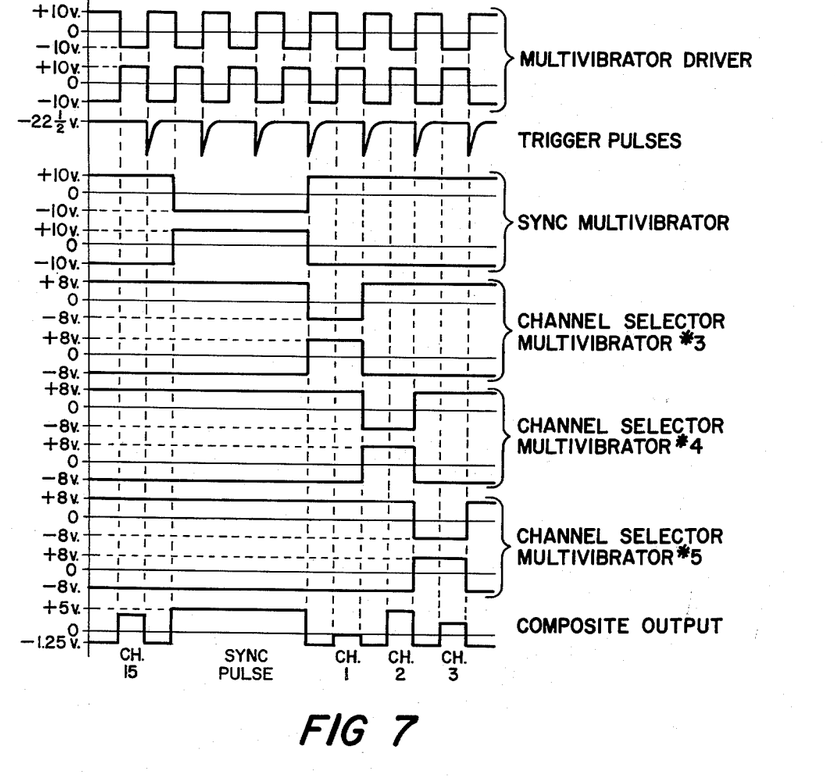
Fig. 7 is a diagram illustrating the waveforms at various points throughout the system of the present invention.

Each element of the matrix is selected by coincident pulses from one multivibrator in each ring, and if desired for a 50% duty cycle by a pulse from multivibrator driver 12. When the two rings are pulsed simultaneously the channels are sequentially sampled. Since in the particular example illustrated herein, if it is desired to provide an output waveform which would correspond to the standard presently utilized in other complementary equipment, two of the twenty channel intervals are eliminated by premature reset, and three other consecutive intervals are combined to provide time for the frame synchronizing pulse. This output waveform, as shown in Fig. 7, is comparable to that obtained from the conventional 36 position mechanical commutator commonly used at the present time.

The diode coincidence switches 15 consist of a plurality of channel gating switches such as the one illustrated in Fig. 5. The switch requires ten silicon diodes D1 through D10, two bias resistors 51 and 52 and a load resistor 53.

When terminal H is connected to a positive potential $+E$ and terminal J to a negative potential $-E$, the four ring connected diodes D1, D2, D3 and D4 conduct and the voltage output $E_o$ will be essentially equal to the voltage input $E_i$ provided the diodes are matched in forward voltage drops. Waveforms for operating the channel gating switch are two rectangular pulses of opposite polarity balanced about ground which are obtained from one of the channel selector multivibrator circuits in each ring at points A and B as indicated in Fig. 4 and applied to points A and B in Fig. 5. Typical waveforms from channel selector multivibrators Nos. 3, 4 and 5 are illustrated in Fig. 7. In order to operate any one of the channel selector switches two pulses from one multivibrator in each of the multivibrator rings 13 and 14 are required at the opposite terminals A and B as indicated in Fig. 5 through the diodes D5, D6 and D7 and D8, respectively, as well as two pulses from points C and D in the circuit of the multivibrator 12 as shown in Fig. 3 through diodes D9 and D10 to provide a 50% duty cycle, if desired.

Coupling these waveforms to points K and L through diodes D5 and D6, D7 and D8, and through diodes D9 and D10 during the closed period makes the switch entirely independent of control circuitry, since these diodes are back-biased at this time. Opening of the switch may be made dependent upon coincident pulses from more than two or three multivibrators by adding more pairs of diodes such as D7 and D8 to junction points K and L.

Diodes matched in pairs to approximately 2%, that is D1 matched to D2, and D3 matched to D4, have been found to provide a switch with no more than plus or minus 10 mv. potential difference between input and output terminals.

Since the current voltage characteristic of the silicon diode is nonlinear, the linearity of the diode switch is a function of the supply voltage, the bias resistors and the load applied to the output terminal. For an increasing positive input signal, the currents in diodes D1 and D4 will decrease until cutoff is reached at a voltage $$\left(\frac{R_L}{R_B+R_L}\right)E$$

This feature is useful in limiting the maximum output signal and thereby avoiding over-modulation of the transmitter. For supply voltages of plus and minus 22.5 volts, bias resistors of 2 megohms, load resistor of one megohm, and 5 volts maximum input signal, the largest measured deviation from linearity at 25° C. was plus or minus 2.5 mv. or plus or minus 0.05% of full scale signal voltage. For these conditions, the switch has an input impedance of 500K ohm. The switch can be opened by changing point K to a negative voltage and point L to a positive voltage. The diodes are thereby cut off and the output is isolated from the input through the back resistance of the silicon diodes which is of the order of 10,000 megohms at room temperature. The effect of diode capacitance is negligible at all frequencies for which use of this unit is intended.

*Operation*

The operation of the particular system described herein will be described in more detail showing the interconnections and inter-relationships of the circuits with reference to Fig. 6.

The square wave output from the master oscillator 11 is applied to the master multivibrator driver 12.

The output waveform from the multivibrator driver as illustrated in Fig. 7 is applied from the junction points C and D in Fig. 3 to the terminals C and D of the diode switch in Fig. 5, if a 50% duty cycle is desired. This arrangement of diode switch with voltages from the multivibrator during a half of each cycle will open the switch during a half of the cycle at which time the $-1.25$ volts is applied to the common output through the clamp 61 which is actuated by another opposite signal from the multivibrator driver 12.

The output of trigger pulses from the terminal D of the multivibrator driver as shown in Fig. 3 is applied to the trigger generator 55 of Fig. 6, which consists of the transistor 47 and resistor 49 and applies trigger pulses to each of the channel selector multivibrators 1, 2, 3, 4 and 5 in the multivibrator ring 14 and the channel selector multivibrators A, B, C and D in the multivibrator ring 13.

In Fig. 6 each of the channel gating switches for the individual channel voltages is indicated by a crossed hatched circle with the abbreviation CH. 1 through CH. 15 with the terminal indicated for the input voltages E1 through E15.

Each of these channel switches is shown as connected to the multivibrator driver 12 and to one pair of the channel selector multivibrators, consisting of one multivibrator in each of the rings 13 and 14, so that coincident pulses from all three of the multivibrator inputs is required for an output $E_o$ to the common output shown in Fig. 6.

Since the multivibrator driver will apply the proper pulse during a half of each cycle to all of the channel switches, when coincident pulses from multivibrators C and 3 are applied the channel one switch will conduct and the voltage E1 will show at the common output. During the other half of the cycle, the $-1.25$ volt will appear through the clamp 61, which is closed during the other half of the cycle by the opposite pulse from the multivibrator driver. The other channel switches will be actuated sequentially by coincident pulses from the multivibrator driver and multivibrators D and 4 for channel 2, A and 5 for channel 3, B and 1 for channel 4, C and 2 for channel 5, etc. through A and 2 for channel 15.

Subsequently, coincident pulses will be applied from multivibrators B and 3 to the coincidence detector 56 which is also connected to the multivibrator driver 12. A reset pulse from coincidence detector 56 causes premature reset of rings 13 and 14 so that multivibrators A and 1 will be actuated next after B and 3.

The synchronizing pulse is formed by triggering on the bistable synchronizing multivibrator 57 for a time equal to 2½ channel periods by means of the diode coincidence detectors 57 and 59. The synchronizing multivibrator 57 connects the 5 volt instrumentation source to the common output through actuation of the sync gate 58 for the duration of the synchronizing interval, until a pulse from the coincidence detector 59 is applied to the sync multivibrator 57 to turn it off. This pulse is derived from coincident pulses from the channel multivibrators B and 2.

The composite output is illustrated in Fig. 7 showing typical outputs for channels 1, 2, 3 and 15 as well as the sync pulse.

It should be noted that none of the circuits described herein requires a ground connection. In fact the entire commutator may operate across a single 45 volt battery in the particular embodiment described. The only ground requirement is a reference for the input and output signals. This is obtained from a center-tapped bleeder resistor 54 across the power source as shown in Fig. 6 providing the outputs −E and +E which are connected as indicated to the circuits in Figs. 2 through 5. For equal bias resistors 51 and 52 in each of the diode switches shown in Fig. 5, the output is centered about midpoint of the supply battery voltage. The only current flowing from the midpoint of the bleeder to offset this voltage from midpoint of the battery voltage is the signal current. The worst condition exists with a 5-volt signal on all channels. With a one megohm load at the common output of the switches at a 20K ohm center-tapped bleeder, the error introduced by ground potential shift is about 0.04% of 5 volts. This is negligibly small and will be less for all other signal amplitude distributions. All of the circuits operate satisfactorily down to approximately 80% of the nominal supply voltage. Limiting of the output signal due to decrease in switch control voltages occurs at approximately 30 volt supply which represents a decrease of over 30% from the nominal supply voltage. At this voltage, the error due to switch non-linearity increases to about 1%. However, this can be reduced by an increase in the diode bias current. For the same decrease in supply voltage, the master oscillator frequency decreases by only about 1.5%. The total power consumption with the circuit as described herein is approximately one watt.

It will be apparent that the electronic commutator of the present invention is a great improvement over previous mechanical commutators and has many inherent advantages over other electronic commutators. It will provide improved reliability and reduce power consumption and size, and increased stability of sampling rate thus aiding in the decoding process. The system is equally useful in the channel separating function at the ground station or as a fast electronic switch for sampling of multiple inputs and sequential feed to digitizing equipment. In some applications, fewer diodes may be used in the channel gating switches. Removing the restriction on duty cycle would eliminate two diodes D9 and D10 per channel. Single ring stepping chain control of "in line" channel switches would eliminate two more diodes per channel. By applying the high speed electronic commutation of the present invention to a PAM/FM telemeter system, it will be apparent that such a telemeter would have substantial advantages over the widely used FM/FM system, one of the most important being stability and uniformity of channel response, making possible automatic stabilization at zero in full scale channel modulation levels.

Obviously many modifications and variations of the present invention are possible in the light of the above teachings. It is therefore to be understood that within the scope of the appended claims the invention may be practiced otherwise than as specifically described.

What is claimed is:

1. A time multiplexer comprising a master oscillator, a multivibrator driver associated with said oscillator, a trigger generator associated with said driver, at least one multivibrator ring counter chain associated with said driver and said trigger generator for cyclic operation thereof, diode channel coincidence switches each connected to one of a plurality of input channels and to said driver and successively connected to at least one multivibrator in each ring for sequential operation thereof, two diode coincidence detectors connected to said driver and certain ones of said multivibrators in each ring between said input channels, a synchronizing multivibrator connected to said detectors, a synchronizing gate activated by said synchronizing multivibrator and a voltage source and adapted to be turned on and off to form a synchronizing channel; only one of said multivibrators in each ring counter chain being in ON condition at any instant, the multivibrators in each ring counter chain each including a pair of transistors, one end of a current limiting resistor connected to the base of each transistor, a load resistance connected to the collector of each transistor, a back-biased diode connected between the other end of each current limiting resistor and the collector circuit of the other of said transistors, said trigger generator operable to apply a trigger pulse to said transistors for switching them ON and OFF, one of said transistors being an NPN junction type operable to have a positive source of voltage applied thereto through a first load resistor connected therewith, the other of said transistors being a PNP junction type operable to have a negative power supply applied thereto through a second load resistor connected therewith, in each ring counter chain all the PNP emitters of the multivibrators being connected together and to said first load resistor and all NPN emitters being connected together and to said second load resistor.

2. A multiplexer as set forth in claim 1 wherein said driver actuates said switches during a half of each channel period, and a clamp connected to said driver and a voltage source and adapted to be turned on during the other half of each channel period.

3. A multiplexer as set forth in claim 1 wherein a balanced power supply is connected to all of the circuits and includes a center tapped bleeder resistor across the power source.

4. A multiplexer as set forth in claim 1 wherein one of said coincidence detectors is connected to said rings for premature reset thereof.

References Cited in the file of this patent

UNITED STATES PATENTS

| | | |
|---|---|---|
| 2,231,687 | Shepard | Feb. 11, 1941 |
| 2,251,025 | Albricht | July 29, 1941 |
| 2,799,727 | Segerstrom | July 16, 1957 |
| 2,816,169 | Pawley | Dec. 10, 1957 |
| 2,823,856 | Booth et al. | Feb. 18, 1958 |
| 2,825,889 | Henle | Mar. 4, 1958 |
| 2,826,692 | Sihvonen | Mar. 11, 1958 |
| 2,831,983 | Ostendorf | Apr. 22, 1958 |